March 26, 1968     J. C. MARTIN     3,374,897
ONE-PIECE FUNNEL WITH INTEGRAL RIBS FOR HOLDING
DISPOSABLE COFFEE CARRYING FILTER
Filed Feb. 1, 1966
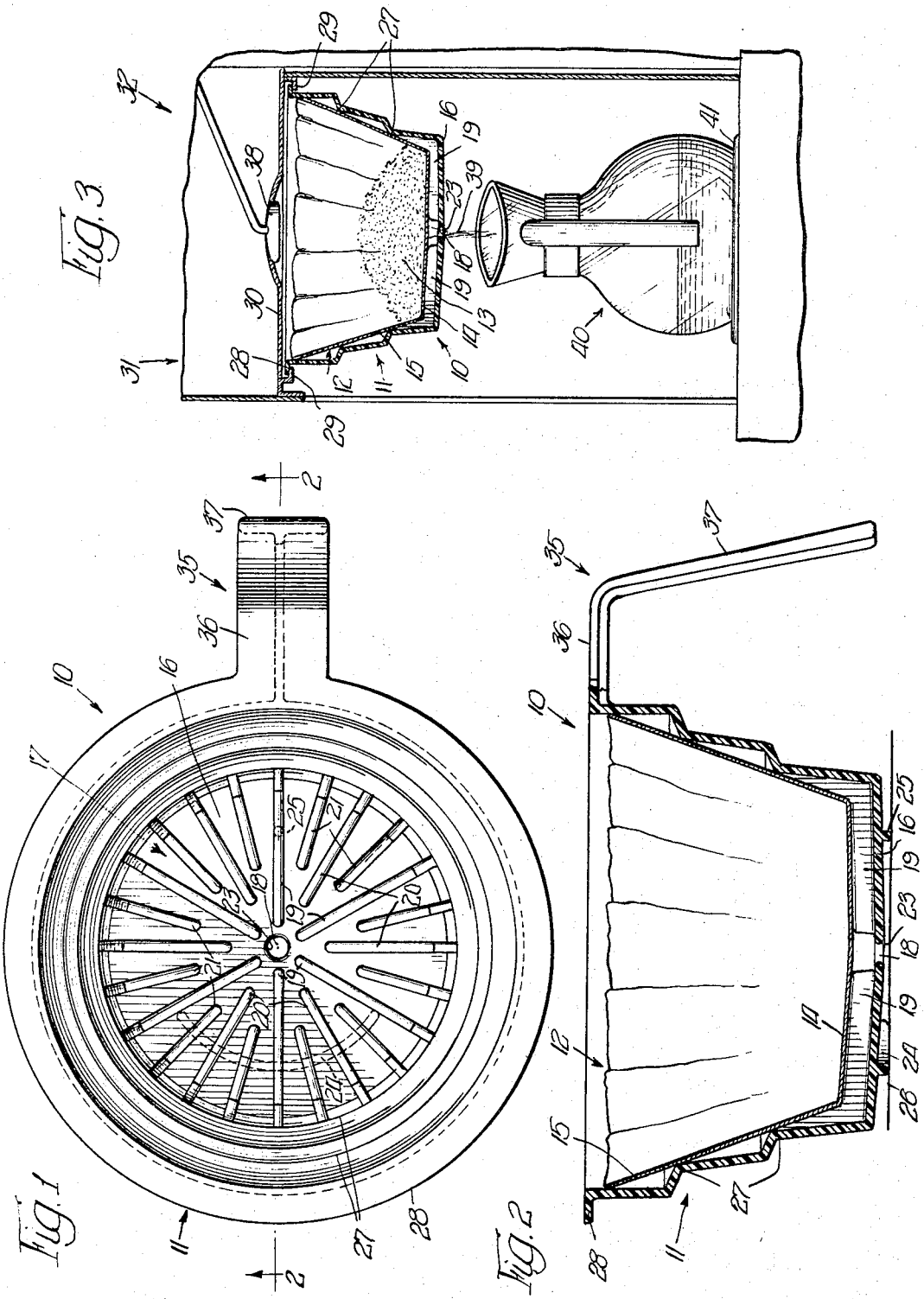

United States Patent Office 3,374,897
Patented Mar. 26, 1968

3,374,897
ONE-PIECE FUNNEL WITH INTEGRAL RIBS FOR HOLDING DISPOSABLE COFFEE CARRYING FILTER
John C. Martin, Springfield, Ill., assignor to Bunn-O-Matic Corporation, Springfield, Ill., a corporation of Delaware
Filed Feb. 1, 1966, Ser. No. 524,184
4 Claims. (Cl. 210—455)

ABSTRACT OF THE DISCLOSURE

A one-piece funnel for holding a disposable coffee carrying filter comprising an apertured sloping bottom and stepped frusto-conical sidewall.

Ribs integral with the bottom and handle integral with the flanged upper end of the sidewall.

---

This invention relates, generally, to beverage apparatus and it has particular relation to infusing receptacles therefor. It constitutes an improvement over the infusing receptacles of U.S. Bunn Patent No. 3,034,418, issued May 15, 1962, U.S. Martin Patent No. 3,149,556, issued Sept. 22, 1964, and U.S. Martin Patent No. 3,220,334, issued Nov. 30, 1965.

In each of the above patents there is provided an infusing receptacle which comprises a metallic conical or frusto-conical funnel having associated therewith a correspondingly shaped metallic wire grill on which a paper filter is positioned for receiving a quantity of ground coffee. Hot water is sprayed over the ground coffee and coffee extract flows out of a central discharge aperture into a beaker therebelow. Usually the funnel and wire grill are formed of stainless steel which is relatively expensive. To manipulate the receptacle, a handle of non-metallic material is attached to the funnel. This further increases the cost and weight of the device.

Among the objects of this invention are: To provide a one piece relatively low cost light weight receptacle for holding a disposable ground coffee carrying filter; to form integrally with the frusto-conical funnel of the receptacle ribs on the upper side of the bottom to space the bottom of the filter therefrom; to arrange the ribs to extend radially from a central discharge aperture in the bottom, there being longer and shorter ribs to provide support for the bottom of the filter over a substantial portion of its underside; to provide an integral annular drip lip around the discharge aperture; to form spacer means integrally with the underside of the bottom of the funnel, the spacer means having a planar downwardly facing surface; to form one or more steps in the conical side portion of the funnel to limit contact with the conical side portion of the filter; to form a handle as an integral extension of the funnel; and to mold the funnel, ribs and handle from thermoplastic material.

In the drawing: FIG. 1 is a top plan view of an infusing receptacle embodying this invention, the showing being at slightly less than full scale. FIG. 2 is a vertical sectional view, taken generally along the line 2—2 of FIG. 1, and showing the paper filter in position. FIG. 3 is a view, partly in vertical section and partly in side elevation, showing the application of the infusing receptacle to a coffee making machine of the type shown in U.S. Martin Patent No. 3,220,334.

In the drawing the reference character 10 designates, generally, an infusing receptacle which comprises a frusto-conical funnel 11 that is formed of molded thermoplastic material such as polypropylene. Other plastic materials, such as polycarbonate, polyethylene, diallyl phthalate, phenol formaldehyde resin, methylmethacrylate resin and the like can be employed.

The funnel 11 is arranged to receive a frusto-conical disposable paper filter 12 on which a quantity of ground coffee 13, FIG. 3, is placed for coffee making purposes. The paper filter 12 has a flat bottom 14 and inclined side wall 15.

In order to space the flat bottom 14 of the paper filter 12 from the bottom 16 of the funnel 11 the latter is provided with a plurality of upstanding ribs, indicated generally at 17. The ribs 17 extend radially from a central discharge aperture 18 in the bottom 16 and comprise relatively long ribs 19 which extend up to the periphery of the central discharge aperture 18, intermediate ribs 20 and short ribs 21. In this manner by the provision of the radially extending ribs 17, it is possible to limit the physical contact with the underside of the bottom 14 of the paper filter 12 while at the same time ample space is provided to permit the free flow of coffee extract to the central discharge aperture 18. It is provided with an annular drip lip 23 so that liquid flowing therethrough has little tendency to flow over the underside of the bottom 16.

Formed integrally with the underside of the bottom 16 is an arcuate support rib 24. Also a boss 25 is formed integrally with the underside of the bottom 16. The arcuate support rib 24 and the boss 25 have a planar downwardly facing surface indicated at 26 to facilitate placing the funnel 11 on a flat surface without tipping.

With a view to limiting the engagement of the funnel 11 with the outer surface of the inclined side portion 15 of the paper filter 12, the side wall of the funnel 11 is stepped annularly as indicated at 27. As shown in FIGS. 2 and 3 this arrangement effectively spaces the inclined side portion 15 of the paper filter 12 from the inclined side wall of the funnel 11.

An annular flange 28 is formed integrally with the upper end of the funnel for slidable mounting on support angles 29 that are carried by the underside of a bottom wall 30 that forms a part of a hood 31 of a coffee making machine that is indicated, generally, at 32 and may be constructed as shown in U.S. Martin Patent No. 3,220,334.

For manipulating the funnel 11 there is molded therewith an inverted L-shaped handle that is indicated generally at 35. The distal end of the shorter arm 36 is molded integrally with the annular flange 28 and the immediately adjacent portion of the upper end of the funnel 11. The longer arm 37 extends downwardly and outwardly to facilitate being grasped by the hand of the operator. For increased strength the handle 35 has a T-shaped cross section.

The frusto-conical paper filter 12 is applied to the funnel 11 together with a charge of ground coffee 13. Then the funnel 11 is placed in operative position in the coffee making machine 32 and hot water is caused to flow from a spray head 38 over the ground coffee 13. The coffee extract 39 flows downwardly through the central discharge aperture 18 into a beaker 40 therebelow which may be mounted on a heater element 41 to maintain the coffee extract at the desired temperature.

After the desired quantity of hot water has been sprayed onto the ground coffee 13 and the flow of coffee extract 39 has ceased, the infusing receptacle 10 is withdrawn from the coffee making machine 32 and turned upside down over a suitable waste receptacle. The paper filter 12 together with the spent coffee grounds drops from the funnel 11. On turning the funnel 11 right side up, another paper filter 12 can be applied and the foregoing steps repeated.

What is claimed as new is:
1. Means for holding a disposable frusto-conical filter carrying ground coffee for use in a coffee making machine comprising:

a one-piece frusto-conical funnel having a bottom inclined to a discharge aperture, ribs integral with the upper side of said bottom for underlying said filter and spacing the same from said bottom, the conical side portion of said funnel being stepped by frusto-conical sections of said side portions intersecting at obtuse angles to provide annular limited area contact with said filter, an annular flange extending radially from the upper end of said funnel, and an inverted L-shaped handle the distal end of the shorter arm of which is integrally joined to said annular flange and extends radially therefrom and the longer arm of which extends angularly outwardly from said shorter arm.

2. The filter holding means of claim 1 wherein: the funnel, ribs and handle are formed of molded thermoplastic material.

3. The filter holding means of claim 1 wherein: said handle has a reenforced cross section.

4. The filter holding means of claim 1 wherein: said handle has a generally T-shaped cross section.

References Cited

UNITED STATES PATENTS

| | | | |
|---|---|---|---|
| 407,253 | 7/1889 | Sautter | 210—455 |
| 3,334,574 | 8/1967 | Douglas | 210—455 X |

FOREIGN PATENTS

| | | |
|---|---|---|
| 635,095 | 9/1936 | Germany. |
| 638,773 | 11/1936 | Germany. |
| 698,262 | 10/1953 | Great Britain. |

SAMIH N. ZAHARNA, *Primary Examiner.*

FRANK W. MEDLEY, REUBEN FRIEDMAN,
*Examiners.*